United States Patent [19]
Dais et al.

[11] Patent Number: 4,463,881
[45] Date of Patent: Aug. 7, 1984

[54] INJECTOR FOR MOLDING HARDENABLE LIQUID PRECURSORS

[75] Inventors: William F. Dais, Washington; Antoni J. Malarz, Warren, both of Mich.

[73] Assignee: General Motors Corporation, Detroit, Mich.

[21] Appl. No.: 329,390

[22] Filed: Dec. 10, 1981

[51] Int. Cl.³ .............................................. B67D 5/40
[52] U.S. Cl. .................................... 222/375; 417/490
[58] Field of Search ............... 222/372, 380, 375, 378; 417/900, 490, 500, 569; 425/564, 566, 562; 264/328.6

[56] References Cited

U.S. PATENT DOCUMENTS 3,153,385 10/1964 Bowen, Jr. ........................... 417/490
3,213,903 10/1965 Armstrong ........................... 222/372
4,013,391 3/1977 Boden et al. ......................... 425/562
4,187,060 2/1980 Ellis et al. ............................. 417/490

Primary Examiner—Joseph J. Rolla
Assistant Examiner—Kenneth Noland
Attorney, Agent, or Firm—Elizabeth F. Harasek

[57] ABSTRACT

An injector is provided for injecting hardenable liquid polymer precursors from an accumulator into a mold in a reaction injection molding process. A specially adapted plunger is employed to eject the liquid precursor from an accumulator barrel. The plunger provides a constant fluid-flow relationship between the liquid precursor inlet and the accumulator barrel during its full stroke. The plunger structure prevents the introduction of air and substantially empties the accumulator on each molding cycle.

4 Claims, 4 Drawing Figures

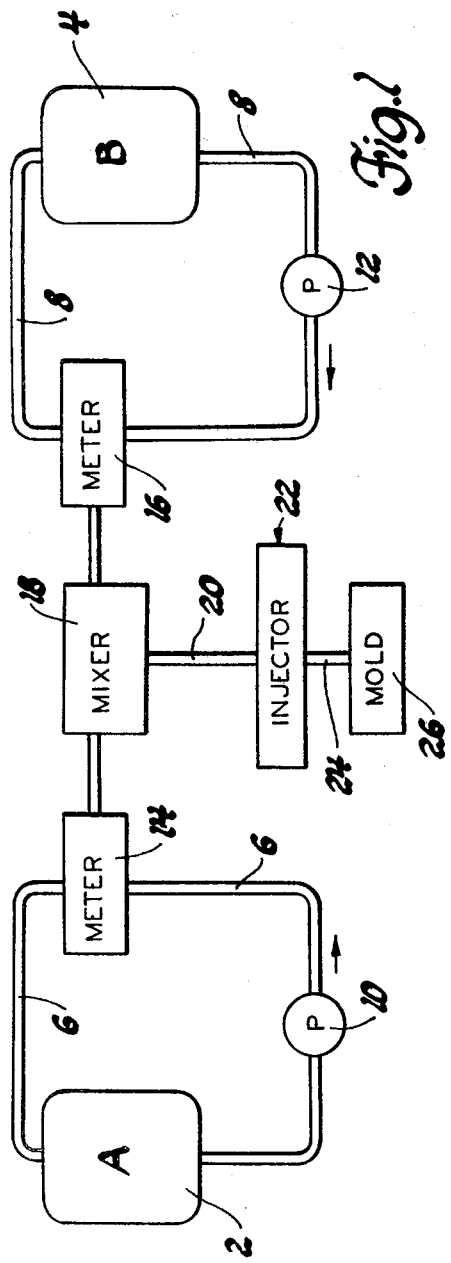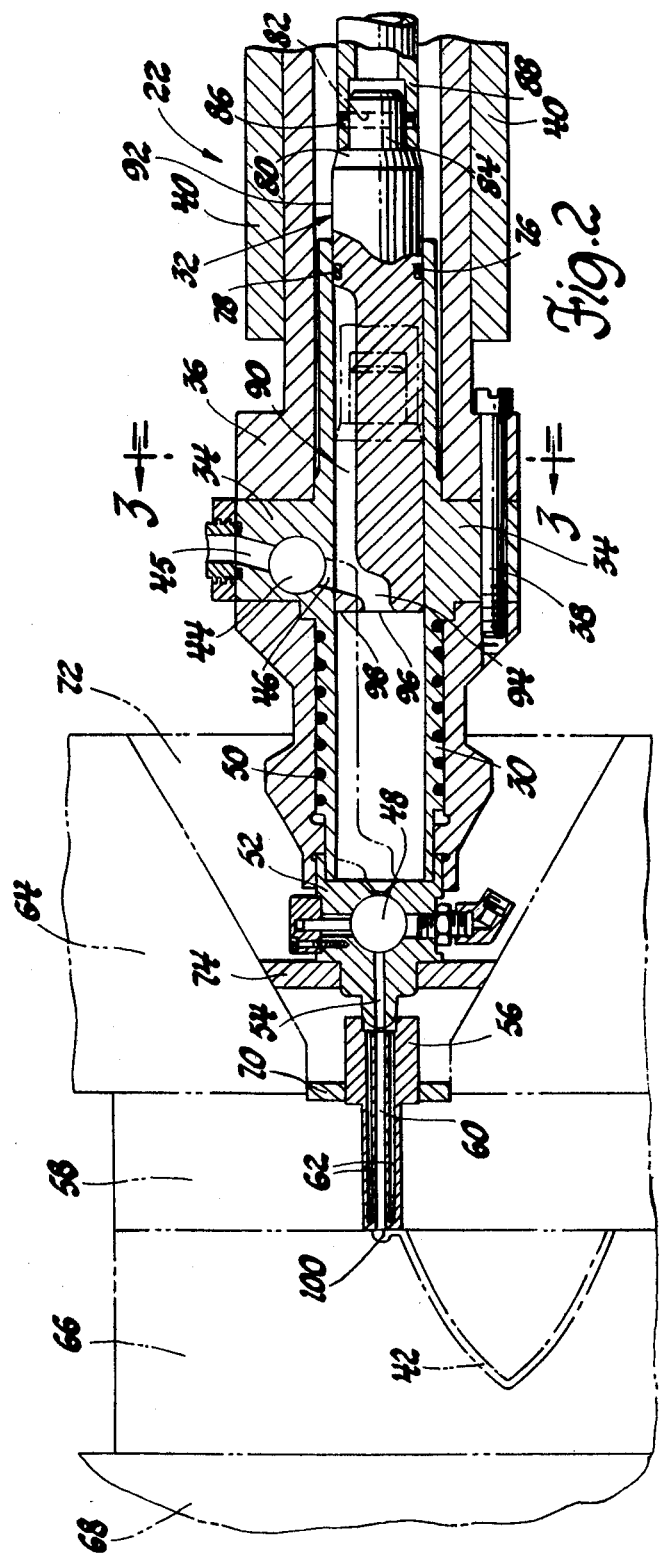

INJECTOR FOR MOLDING HARDENABLE LIQUID PRECURSORS

FIELD OF THE INVENTION

This invention relates to an improved injector for delivering reaction hardenable liquid polymeric constituents into a mold. More particularly, the invention relates to an improved plunger for rapidly delivering reaction injection moldable liquids from an accumulator cylinder into a mold.

BACKGROUND OF THE INVENTION

One means of molding thermosetting polymeric articles is the injection of a chemically reactive liquid precursor into a mold. Once in the mold, a rapid polymerization reaction takes place yielding a hardened, chemically cross-linked polymeric article. This process is generally referred to as reaction injection molding (RIM).

In the RIM process, it is extremely undesirable to have the reactive constituents polymerize and harden in the injection equipment prior to the entry into the mold. In order to achieve good mold cycle times, however, it is imperative that the liquid precursor set up within seconds of mold injection. These two ends tend to be in conflict with one another.

At this time, RIM systems are used to mold large polyurethane articles such as automotive body panels and fascia. Polyurethane is formed by the rapid polymerization of a mixture of highly catalyzed polyol and isocyanate constituents in a mold. The polyol and isocyanate constituents are fairly inert individually, but react very rapidly once they are mixed. Accordingly, the components are initially retained in separate containers and impingement mixed as needed immediately prior to molding. In some systems, the reactive mixture is momentarily accumulated in a cylindrical injector barrel and a plunger is used to rapidly eject the mixture into the mold. The accumulator is generally provided with cooling means to retard polymerization. For the same reason, the accumulator barrel inlet is generally located some distance from the heated mold.

A problem with this type of RIM system is that if the injection plunger is stroked fully forward to empty the accumulator barrel on each shot, a vacuum is created as the plunger is retracted which causes air to be drawn into the accumulator. The air mixes with incoming liquid constituents creating bubbles and voids in the next article molded. This problem may be avoided by never allowing the plunger to move forward of the barrel inlet port for the reactive liquid constituents. However, an excessive amount of reactive material then remains in the accumulator barrel between molding cycles. Even with cooling, the constituents have a tendency to begin to set-up which ruins or reduces the quality of subsequently molded parts.

Thus, means have been sought to provide for rapid delivery of RIM constituents from an accumulator to a mold such that reciprocation of the plunger causes only a minimal amount of reactive material to remain in the accumulator barrel between mold cycles and so that little or no air is introduced.

OBJECT OF THE INVENTION

It is therefore an object of the invention to provide an improved injector for rapidly introducing chemically reactive, hardenable, liquid constituents into a mold. It is a more particular object to provide an improved reciprocatable plunger for injecting such reactive materials into a mold from an accumulator barrel, which plunger minimizes the amount of reactive constituent left in the accumulator between mold cycles and which prevents the introduction of air into the system as the plunger retracts.

A more specific object is to provide an improved injection plunger which is adaptable for use in existing RIM equipment or modified reciprocating screw injection molding machines conventionally used for processing thermoplastics. The plunger is adapted to provide a continuous fluid flow path between a source of reactive liquid constituent and an accumulator barrel. The flow of constituent is controlled by accumulator barrel inlet and outlet valves to prevent air from entering the system. The plunger design also provides means for substantially emptying the accumulator barrel during each molding cycle.

BRIEF SUMMARY OF THE INVENTION

These and other objects are accomplished by improved injector means for delivering hardenable, chemically reactive, liquid constituents into a mold. In the injector, chemically reactive liquid constituents are first delivered into an accumulator barrel through a valved inlet. The inlet is located a substantial distance away from the barrel outlet to the heated mold. The accumulator barrel has a generally cylindrical shape, and is surrounded by cooling means to inhibit premature reaction of the constituents.

At the heart of the invention, is a specially adapted plunger for delivering the liquid constituents from the accumulator barrel into the mold under high pressure in a very short period of time. The plunger body is shaped and sized to reciprocate in the accumulator barrel with relatively close tolerances between the plunger surfaces and the barrel walls. The reciprocation of the plunger is coordinated with the opening and closing of fluid flow control valves at the accumulator barrel inlet and outlet. The improved plunger is provided with an elongated groove in its surface. The groove is shaped and oriented with respect to the barrel to be in constant fluid flow communication with the liquid inlet during the stroke of the plunger. The groove, in turn, communicates with a port in the working face of the plunger.

To deliver a shot of liquid polymer precursor into the mold from the accumulator barrel, the barrel inlet valve is closed and the barrel outlet valve is opened. The plunger is stroked completely forward in the accumulator barrel forcing the liquid constituents out into the mold. Only a small amount of liquid material remains in the accumulator barrel, i.e., the material in the plunger groove and its working face outlet. To collect liquid constituent in the accumulator barrel for the next shot, the barrel outlet valve is closed and the inlet valve is opened. The plunger is then retracted at a rate such that the liquid precursor flows through the valved inlet, through the slot in the plunger, and out through the head of the plunger into the accumulator barrel.

The structure and operation of the plunger provide no opportunity for air to enter the accumulator. Moreover, no appreciable amount of material is left in the accumulator barrel between shots. The design of the plunger assures that any material that does remain is the first material ejected from the barrel in the next shot. Thus, the dwell time for liquid constituent in the chilled accumulator barrel is always short enough to prevent any appreciable solidification.

DETAILED DESCRIPTION OF THE INVENTION

Our invention will be better understood in view of the figures and the detailed description which follows.

FIG. 1 is a schematic representation of a typical two-component reaction injection molding (RIM) system.

FIG. 2 is a side sectional view of an injector for a reaction injection molding system having a modified plunger in accordance with the invention.

Figure 3:
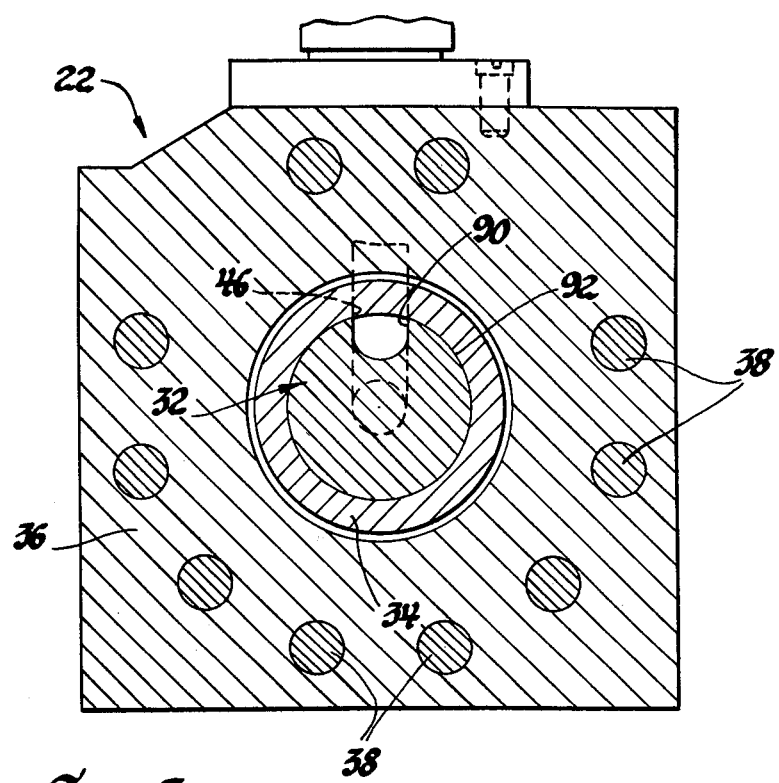
FIG. 3 is a sectional view taken along line 3—3 of FIG. 2.

FIG. 1 is a schematic representation of a typical two-part reaction injection molding system. Part A and part B are retained in tank 2 and tank 4, respectively. Each part is a liquid polymer precursor constituent. Constituents A and B may be nucleated and filled with fiberglass or other reinforcements as desired, and are continuously recycled through lines 6 and 8, respectively. Line pressure is provided by pumps 10 and 12.

While neither constituent is very reactive alone, when the A and B constituents are mixed together they rapidly react to form a solid polymer material. In the system, constituents A and B are metered through meters 14 and 16 simultaneously and thoroughly mixed in the mixer 18. From mixer 18, the constituents flow through line 20 to injector 22. From the injector, the mixed constituents are rapidly delivered through a short runner 24 into mold 26 where they quickly react and harden to form a polymeric article.

FIG. 2 is a side sectional view of an injector 22 in accordance with the invention. Herein, the term injector refers to an assembly in which hardenable liquid constituents are accumulated and from which they are injected into a mold.

Functional elements of an injector 22 are shown in FIGS. 2 and 3. The key elements are a right circular cylindrical accumulator barrel 30 and a specially adapted injection plunger 32 which reciprocates therein. Barrel 30 is formed inside barrel housing 34. Barrel housing 34, in turn, is mounted to press barrel 36 by means of bolts 38. Press barrel 36 is fixed in stationary housing 40 of a conventional reciprocating screw injection molding machine which is not shown in its entirety in the figures. Accumulator barrel 30 serves to collect an amount of hardenable, liquid polymer precursors needed to mold a part in mold cavity 42. The liquid material flows from a remote source thereof (not shown), through conduit 45, inlet valve 44 and then through accumulator barrel inlet 46 as plunger 32 is retracted. Nozzle outlet valve 48 is closed while the liquid is introduced.

Inlet valve 44 and outlet valve 48 are operable between open and closed positions. They may be shuttle valves, ball valves or of any other suitable valve type. The valves may be controlled hydraulically, pneumatically, by means of solenoids, or in any other suitable manner. Inlet valve 44 and outlet valve 48 are provided with position sensors (not shown) to determine whether they are in open or closed positions and are operatively slaved by conventional means to open and close cooperatively as will be described hereafter.

The liquid accumulated in barrel 30 is highly chemically reactive. Therefore, barrel 30 is cooled by means of fluid bearing cooling coils 50 retained within housing 34 to inhibit premature solidification. An injection nozzle body 52 is located at the outlet end of accumulator barrel 30. Nozzle orifice 54 serves to transport the liquid from barrel 30 to sprue bushing 56 in stationary mold 58. Sprue orifice 60 is cooled by water flowing through cooling jacket 62 within sprue bushing 56 to inhibit solidification of the liquid. Sprue bushing 56 is located in the fixed press mold 58 mounted to fixed platen 64. The mold cavity 42 is formed between fixed mold 58 and movable press mold 66 mounted to movable platen 68.

Ideally, a runnerless mold cavity (avoiding sprue bushing 56) would be used in a production tool to avoid any dwell of reactive material in a heated mold.

Spacer sleeve 70 accurately locates sprue bushing 56 with respect to the fixed press platen 64. Injector assembly 22 is itself mounted in a funnel-shaped opening 72 in platen 64. Annular collar 74 stabilizes the position of nozzle 52 with respect to fixed platen 64.

Figure 4:
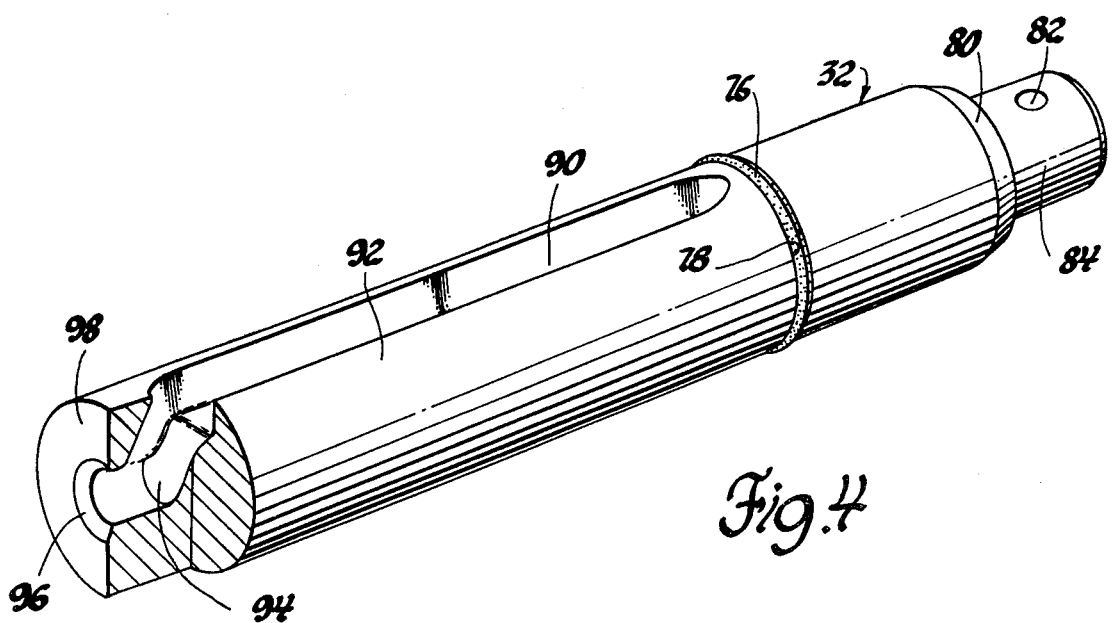
FIG. 4 is a perspective view of the plunger of FIGS. 2 and 3.

Referring to FIGS. 2 and 3, plunger 32 has a right circular cylindrical shape. It reciprocates with close tolerance in accumulator barrel 30. In FIG. 2, plunger 32 is shown in the retracted position with solid lines and in the fully forward position with phantom lines. Annular gasket 76 was provided in groove 78 about a circumference of plunger 32 to prevent any reactive liquid material from leaking behind the plunger. The end of plunger 32 remote from nozzle 52 tapers at 80 to a smaller diameter. As best seen at FIG. 4, hole 82 was provided in small end 84 of plunger 32. Connector 86 was inserted through hole 82 to attach plunger 32 to driver rod 88.

FIG. 4 clearly depicts slot 90 which is longitudinally oriented on the cylindrical surface 92 of plunger 32. The broken away portion of FIG. 4 shows connecting passage 94 between slot 90 and tapered outlet 96 on working head or face 98 of plunger 32. Referring again to FIG. 2, it may be clearly seen that as plunger 32 reciprocates, slot 90 is in constant fluid flow connection with fluid inlet 46. The importance of the relationship between the accumulator inlet, plunger slot and accumulator barrel will be better appreciated in view of the following description of the operation of the subject injector apparatus.

Injector 22 functions as follows. Referring again to FIG. 2, plunger 32 (as depicted in solid lines) is in the fully retracted position. Accumulator barrel 30 is full of reactive liquid constituent. At this point, inlet valve 44 and outlet valve 48 are both closed. In order to deliver a shot into mold 42, nozzle outlet valve 48 is opened and plunger 32 is brought into the fully forward position (shown in phantom lines). All the material except that in slot 90 of plunger 32 is ejected through the nozzle orifice 54, through sprue 60 and into mold cavity 42. The liquid is cooled along its entire path from the accumulator through the sprue and is first heated in the mold cavity. Once in the mold cavity, the reactive liquid hardens quickly, movable mold 66 is pulled out of the way, and the part is ejected breaking away at end 100 of sprue 60. Meanwhile, the nozzle outlet valve 48 is closed while material inlet valve 44 is opened.

Plunger 32 is retracted in accumulator barrel 30 at a rate such that liquid flowing through inlet valve 44 completely fills the accumulator barrel 30 without introducing any air into the system. Once plunger 32 is fully retracted, inlet valve 44 is closed. The injector is now ready for delivering the next shot to the mold as just described.

It is the provision of slot in the plunger for continuous fluid-flow connection between a source of hardenable reactive constituent and the accumulator barrel that provides the desired beneficial results. That is, no air is introduced into the system and the accumulator barrel is substantially emptied with every shot. Moreover, any liquid that remains in the accumulator slot is the first material displaced by oncoming material and delivered to the mold in the following shot.

We have found that a straight longitudinal slot in the plunger surface in direct fluid-flow relation to an outlet in the working head of the plunger provides the desired results when the plunger is reciprocated in the barrel without any rotational motion. However, the specific shape or orientation of the plunger slot and head outlet are not critical to the invention except that the slot must be situated on the surface of a plunger so that it is always in contact with the constituent inlet. If, for example, the plunger were rotated in the barrel when reciprocated, the slot would have to be helically oriented on the plunger surface to provide for continuous contact with the inlet. It may also be preferable to locate the outlet at the working head of the plunger off-center to encourage turbulence of the constituent as it flows into the accumulator barrel.

While my invention has been described in terms of a specific embodiment thereof, other forms may be readily adapted by one skilled in the art. Accordingly the scope of my invention is to be limited only by the following claims.

The embodiments of the invention in which an exclusive property or privilege is claimed are defined as follows.

1. An injector for delivering liquid reaction injection molded polymer precursors to a mold comprising an accumulator having a cylindrical hollow barrel for receiving and retaining a predetermined amount of a said liquid precursor, an outlet from said accumulator barrel to a said mold, an inlet to said accumulator for said liquid remote from the barrel outlet, first valve means operable between open and closed positions for controlling the flow of said liquid through said barrel inlet, second valve means operable between open and closed positions and cooperative with said first valve means for controlling the flow of said liquid through the barrel outlet to the mold, cylindrical plunger means cooperative with and reciprocatable in said accumulator barrel between a first retracted position for retaining a said amount of the precursor liquid prior to molding and a second fully forward position whereat substantially all the liquid is ejected from the barrel, said plunger having in its cylindrical side walls which empties through a portal in the working face of the plunger, said slot being sized and located such that there is constant fluid-flow communication between said barrel inlet and the barrel between said first and second plunger positions, wherein said injector the retraction of the plunger from said second position to said first position with said first valve means open and said second valve means closed causes said barrel to fill with a desired amount of said liquid constituent without introducing air, and where the stroke of said plunger from said first to said second position with said first valve means closed and said second valve means open causes the liquid within the accumulator to be rapidly ejected from the barrel into the mold where it reacts to form a polymeric article.

2. In an injector for delivering a hardenable chemically reactive liquid constituent from an accumulator barrel to a mold in the making of a polymeric article, the improvement comprising a plunger cooperative with said accumulator barrel for ejecting said constituent from the barrel into a mold, said plunger being reciprocatable in said barrel in close tolerance therewith such that in the molding of a said article said plunger reciprocates from a first retracted filling position whereat the barrel retains a predetermined amount of said liquid constituent to a second extended delivery position whereat said constituent is ejected from the barrel into the mold by the advancing face of the plunger, said plunger having a peripheral groove in its surface which communicates with an outlet in the face thereof, the groove being located such that it is in constant fluid-flow communication with a barrel inlet and a barrel outlet for said reactive constituent in and between said first and second plunger positions.

3. A plunger for delivering a hardenable liquid polymer precursor constituent from an accumulator barrel having an outlet to a mold and a constituent inlet remote from and upstream of said outlet comprising a cylindrical plunger body whose radial dimensions closely approximate the radial dimensions of the barrel and a plunger head surface which functions as the upstream rear wall of the barrel and the driving force for ejecting the constituent from the barrel outlet, said plunger being reciprocatable in said barrel from a first retracted position for retaining a desired amount of a said liquid precursor constituent prior to molding to a second position fully forward in said barrel for emptying said barrel by ejecting said constituent through the barrel outlet into a mold, said plunger having a peripheral groove in the longitudinal cylindrical surface which is in fluid-flow communication with an outlet in the plunger head, said groove being located such that it is in constant fluid-flow relation with the barrel inlet for said liquid constituent between said first and second positions thereby preventing the introduction of air into the barrel as the constituent flows from the barrel inlet, through the groove, out the plunger head and into the accumulator barrel as the plunger retracts and said plunger serving to substantially empty the barrel when in said second position.

4. A plunger for use in a reaction injection molding machine wherein the reactive liquid constituent is collected and retained in an accumulator barrel immediately prior to molding comprising a cylinder plunger body that reciprocates in closely fitting relation within the accumulator barrel, a groove in the longitudinal surface of the plunger, an outlet in the face of the plunger opposite the barrel outlet to the mold, and a fluid flow connection in the body of the plunger between said groove and said face outlet such that there is a continuous fluid flow relation between a barrel inlet and the barrel in all reciprocating plunger positions, wherein a molding cycle said reaction liquid contituent enters said barrel at a location remote from the barrel outlet to the mold such that as the plunger is retracted the constituent flows continuously through the plunger groove, the connection and the face outlet into the accumulator barrel such that no air is introduced therein, and such that as the plunger is stroked fully forward in the barrel the constituent is ejected therefrom and any constituent remaining in said plunger groove is flushed from the barrel on the following molding cycle.

* * * * *